No. 733,456. PATENTED JULY 14, 1903.
F. E. A. BROCK.
CREAM WHIPPING MACHINE.
APPLICATION FILED FEB. 24, 1903.
NO MODEL. 2 SHEETS—SHEET 1.

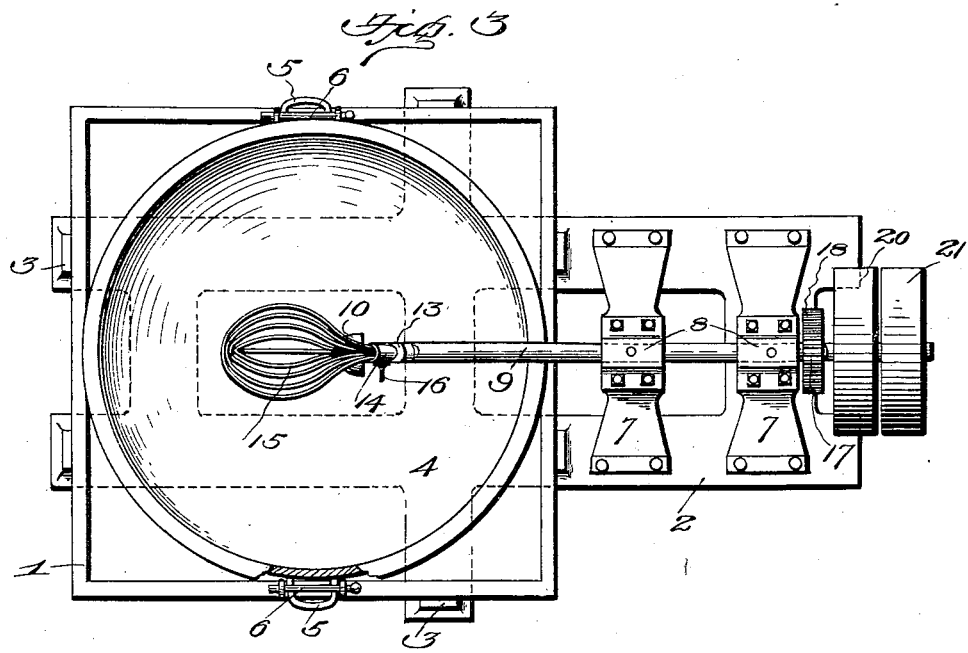
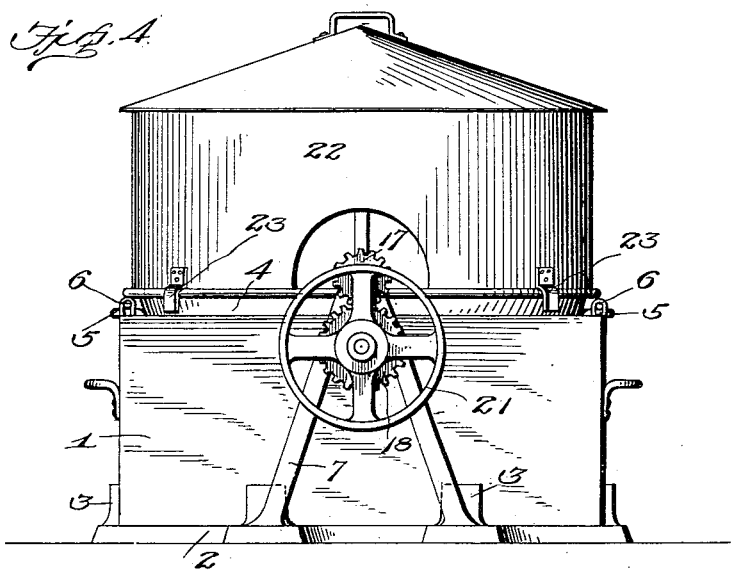

No. 733,456. Patented July 14, 1903.

UNITED STATES PATENT OFFICE.

FREDERICK E. A. BROCK, OF ST. LOUIS, MISSOURI, ASSIGNOR TO THE BUSY BEE CANDY COMPANY, OF ST. LOUIS, MISSOURI.

CREAM-WHIPPING MACHINE.

SPECIFICATION forming part of Letters Patent No. 733,456, dated July 14, 1903.

Application filed February 24, 1903. Serial No. 144,803. (No model.)

*To all whom it may concern:*

Be it known that I, FREDERICK E. A. BROCK, a citizen of the United States, residing at St. Louis, in the State of Missouri, have invented certain new and useful Improvements in Cream-Whipping Machines; and I do declare the following to be a full, clear, and exact description of the invention, such as will enable others skilled in the art to which it appertains to make and use the same.

This invention relates to improvements in machines for whipping cream, eggs, sponge, and the like, the object being to produce a machine for this purpose by which cream may be quickly whipped to the proper degree without forming butter and which may be advantageously used in the manufacture of cakes and certain varieties of confections.

A further object is to produce such a machine which will be simple in construction, strong and durable in use, inexpensive of production, and which may be operated by hand or with power.

With these and other objects in view the invention consists in the construction and arrangement of the parts, as will be hereinafter more fully described, reference being had to the accompanying drawings, in which—

Figure 1:
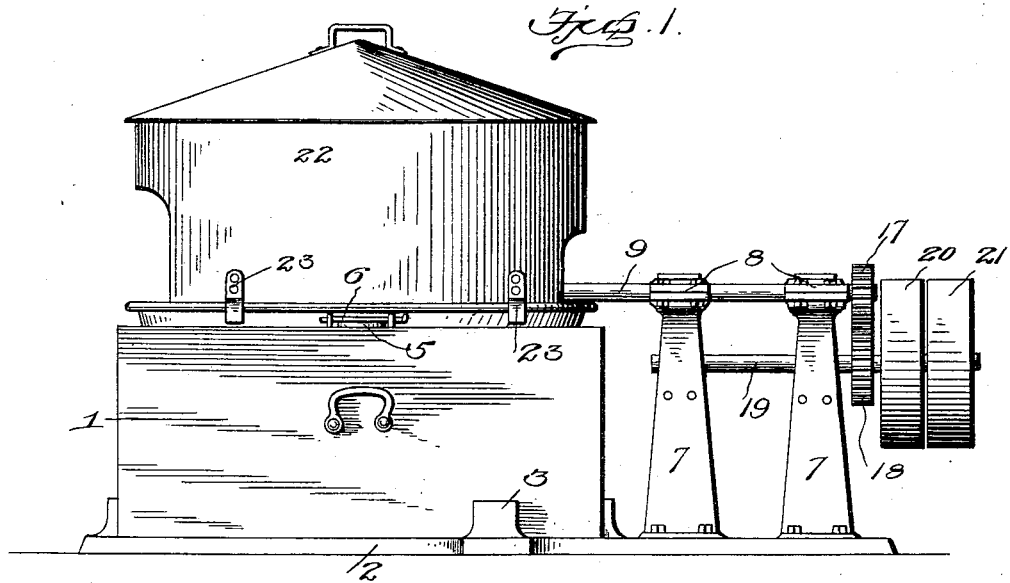
Figure 2:
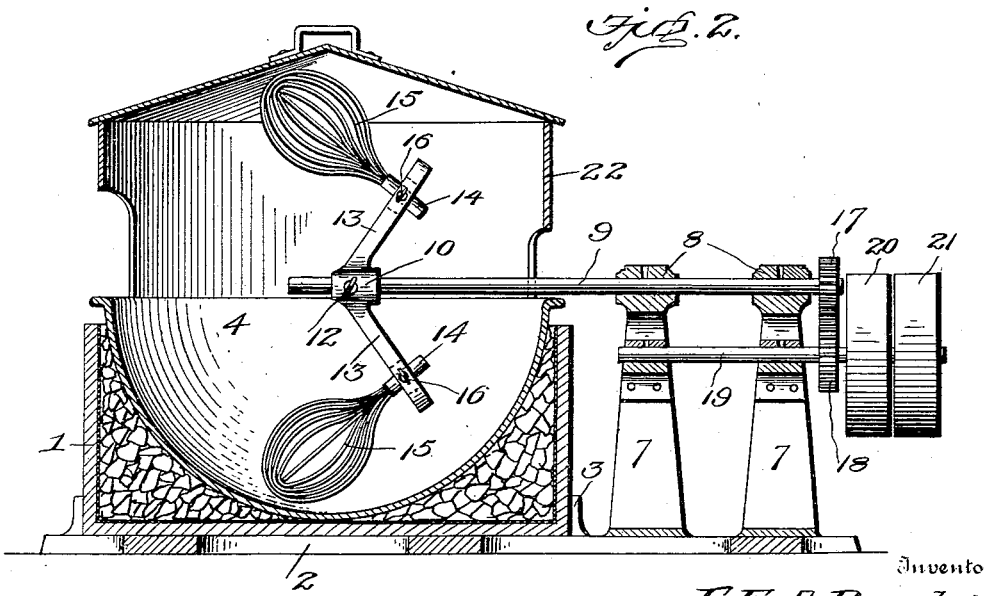

Figure 1 is a side elevation of the machine. Fig. 2 is a longitudinal vertical section of the same. Fig. 3 is a top plan view with the cover removed, and Fig. 4 is an end elevation.

In the embodiment of the invention as herein shown I provide a suitable box or tub 1, which is preferably, though not necessarily, rectangular in shape and constructed of hard wood and lined with zinc or other non-corrosive sheet metal. The box 1 is adapted to rest upon one end of a metal base or frame 2 and to be held in position by means of lugs 3, formed integral with and projecting upward from said base.

4 denotes a kettle formed of suitable metal, preferably of copper, and of a size to snugly fit within the box 1, the handles 5 of said kettle being adapted to rest upon the upper edge of the sides of the box and to be clamped thereto by suitable clamps 6.

7 7 denote vertically-disposed standards rising from the forward end of the base-frame 2. On the upper ends of said standards are formed journal-bearings 8, in which is mounted a horizontally-disposed shaft 9, one end of which is adapted to project over the kettle 4, and on said end is supported a longitudinally-adjustable collar 10, having a set-screw 12, whereby the said collar may be fastened upon the shaft 9 at any desirable point.

Projecting laterally from and formed integrally with the collar 10 are two obliquely-disposed arms 13, which extend forwardly at an acute angle to the shaft 9.

In the arms 13, near the outer ends thereof, are formed slots which are adapted to receive the handles 14 of two whips or beaters 15, which are constructed, preferably, of brass spring-wires bent to the form shown, the ends of said wires being secured in brass tubes which form the handles 14. The whips or beaters are secured within the slots formed in the ends of the arms 13 by means of set-screws 16, whereby said whips may be moved in or out, as desired.

On the opposite or outer end of the shaft 9 is fixed a spur gear-pinion 17, which is adapted to mesh with a similar pinion 18, keyed to a counter-shaft 19, mounted in bearings in the standards 7 7, below the shaft 9. On the outer end of the shaft 19 is mounted a fixed and loose pulley 20 and 21, whereby the shaft 9 is rapidly driven through the medium of the spur-gears 17 and 18. It will be understood, however, that should it be desired to drive the machinery by hand-power a crank and a fly-wheel may be readily substituted for the drive-pulleys.

22 denotes a sheet-metal hood or cover, which is adapted to be placed over the kettle 4 and to rest upon the upper flanged edge of the same and to be held in place by lugs 23, the object of said hood being to prevent the cream from being thrown or splashed out of the kettle. A suitable handle is provided for lifting the hood, and openings may be formed in the sides of the same to accommodate the shaft 9 and for observation purposes. In practice after the kettle has been placed in the box or tub 1 crushed ice is filled in and packed around the same, which is essential to the proper whipping of cream. The cream or other material is now placed in the kettle, the hood or cover arranged in place, and the machine started. A whipping motion is given the whips or beaters, which causes them to strike the cream in one portion of the kettle, allowing it to build up or rise in the other portion of the kettle, thereby preventing a churning action, which would cause the formation of butter instead of whipped cream, which fault is found in most cream-whipping machines now in use.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim, and desire to secure by Letters Patent, is—

In a cream-whipper, the combination with a cream-container, of a horizontal shaft, a sleeve adjustable thereon and provided with outwardly-extending arms set obliquely to the shaft, and whippers adjustably mounted upon said arm and projecting obliquely thereto in the reverse direction, substantially as described.

In testimony whereof I have hereunto set my hand in presence of two subscribing witnesses.

FRED. E. A. BROCK.

Witnesses:
WM. SCHATTGEN,
C. B. KENNEDY.